United States Patent [19]

Harris

[11] Patent Number: 4,709,069

[45] Date of Patent: Nov. 24, 1987

[54] METHOD OF PREPARING HIGH MOLECULAR WEIGHT POLY(ALKYLENE CARBONATE) POLYAHLS

[75] Inventor: Robert F. Harris, Midland, Mich.

[73] Assignee: The Dow Chemical Company, Midland, Mich.

[21] Appl. No.: 850,788

[22] Filed: Apr. 11, 1986

Related U.S. Application Data

[63] Continuation-in-part of Ser. No. 750,362, Jun. 27, 1985.

[51] Int. Cl.$^4$ .............................................. C07C 68/06
[52] U.S. Cl. .................................. 558/265; 558/262; 558/266; 558/268; 558/269
[58] Field of Search ............... 558/265, 262, 266, 268, 558/269

[56] References Cited

U.S. PATENT DOCUMENTS

| | | | |
|---|---|---|---|
| 3,133,113 | 5/1964 | Malkemus | 558/265 |
| 3,248,414 | 4/1966 | Stevens | 558/265 |
| 3,248,415 | 4/1966 | Stevens | 558/265 |
| 3,248,416 | 4/1966 | Stevens | 558/265 |
| 3,689,462 | 9/1972 | Maximovich | 558/265 X |

Primary Examiner—Werren B. Lone
Assistant Examiner—Vera C. Clarke

[57] ABSTRACT

The invention is a process for increasing the molecular weight of a poly(alkylene carbonate) polyahl which comprises exposing the poly(alkylene carbonate) polyahl to elevated temperatures at which dialkylene glycol or initiator segments, wherein the initiator has about the same or greater volatility as the dialkylene glycol segment, are abstracted from the poly(alkylene carbonate), polyahl, at a pressure wherein the dialkylene glycol or initiator is volatile, and removing the volatile dialkylene glycol initiator from the mass of the poly(alkylene carbonate) polyahl, under conditions such that the molecular weight of the poly(alkylene carbonate) polyahl is increased.

18 Claims, No Drawings

METHOD OF PREPARING HIGH MOLECULAR WEIGHT POLY(ALKYLENE CARBONATE) POLYAHLS

CROSS-REFERENCE TO RELATED APPLICATION

This application is a continuation-in-part of copending application Ser. No. 750,362, filed June 27, 1985.

BACKGROUND OF THE INVENTION

This invention relates to a method of increasing the molecular weight of poly(alkylene carbonate) polyahls.

Poly(alkylene carbonate) polyahls are useful in preparing polyurethanes, polyureas and as surfactants.

Poly(alkylene carbonate) polyols can be prepared by the reaction of an alkylene carbonate such as ethylene carbonate with a glycol such as diethylene glycol.

For example, several workers have prepared poly(alkylene carbonate) polyols and related materials by controlling an equilibrium between the reaction materials of a diol and alkylene carbonate and the products of a poly(alkylene carbonate) polyol and monoethylene glycol. The reaction is controlled by the removal of monoethylene glycol.

Malkemus, U.S. Pat. No. 3,133,113 reacted ethylene carbonate and diethylene glycol at 125° C. to 130° C. under reduced pressure of 10 mm Hg in the presence of certain catalysts, e.g., mixed zinc borate-alkaline earth metal oxides, with concurrent removal of monoethylene glycol as distillate. This was followed by removal of starting material. This procedure is plagued by the presence of volatile ethylene carbonate which condenses as a solid throughout the system causing severe plugging and reducing ethylene carbonate conversion while monoethylene glycol is being removed. This process requires large excesses of ethylene carbonate.

Springmann et al., U.S. Pat. No. 3,313,782 further studied this process under reduced pressure in the presence of catalysts and set limits on the reaction conditions; the reaction temperatures must be lower than the boiling point of the alkylene carbonate, but high enough to distill off the monoethylene glycol formed.

Maximovich, U.S. Pat. No. 3,896,090 reacted ethylene carbonate with diethylene glycol and treated the reaction product under reduced pressure to remove the unreacted ethylene carbonate and diethylene glycol.

Lai et al., U.S. Pat. No. 4,131,731 used staged reductions in pressure during the reaction of alkylene carbonate with a diol, wherein the final stage was to remove monoethylene glycol. The patentees characterized their reaction conditions by stating that the alkylene carbonate must have a boiling point 4.9° C. greater than monoethylene glycol. The chemistry based on the above equilibrium was improved by Buysch et al., U.S. Pat. No. 4,105,641 by carrying out the reactions in a solvent (e.g., cumene) capable of removing monoethylene glycol as an azeotrope with the solvent.

Stevens, in U.S. Pat. Nos. 3,248,414; 3,248,415 and 3,248,416, discloses the preparation of poly(alkylene carbonate) polyols from (1) carbon dioxide and 1,2-epoxides; (2) cyclic carbonates such as ethylene carbonate; or (3) from cyclic carbonates and a 1,2-epoxide. A minor amount of a polyol or a polyamine is employed as an initiator. The reaction is usually conducted in the presence of a metal carbonate, metal hydroxide, trisodium phosphate or a tertiary amine. In the Stevens' processes a poly(alkylene carbonate) polyol derived from ethylene carbonate and monoethylene glycol is exposed to temperatures of 160° C. at 2 mm Hg pressure to remove unreacted ethylene carbonate.

Senet, U.S. Pat. No. 4,005,121 prepared poly(alkylene carbonate) polyols by reacting aliphatic diols with diethyl carbonate in a two-stage process. In the first stage, the reaction is carried out in the presence of a basic catalyst at a temperature below 140° C. The basic catalyst is then destroyed and the reaction is completed in the presence of an acidic catalyst at a temperature of between 200° C. and 250° C. Reduced pressure is used toward the end of the second stage.

Poly(alkylene carbonate) polyols have also been prepared by polymerization of ethylene carbonates under pressure using basic catalysts and a minor amount of glycol as initiator, Buysch et al., U.S. Pat. No. 4,105,641. These products are low in carbonate and high in ether groups concentration due to decomposition of the ethylene carbonate.

Conventionally, the molecular weights of poly(alkylene carbonate) polyahls from alkylene carbonates have been controlled by either the stoichiometry of the reactants, that is, higher alkylene carbonate to initiator ratios for higher molecular weights, or the removal of monoethylene glycol from the reaction mixture wherein an ethylene carbonate to initiator equivalent ratio of about 1 is used. Catalysts are used in most cases, as reaction rates are very slow in the absence of a catalyst. When high alkylene carbonate to initiator ratios are used to make higher molecular weight poly(alkylene carbonate) polyahls, reaction rates drop severely as higher conversions are approached; long reaction times are required and the products are contaminated by unreacted alkylene carbonate. If temperatures are increased to increase the rate, the product decomposition occurs with $CO_2$ loss. In the instant process, rates of molecular weight build are rapid without $CO_2$ loss. The choice of catalyst has an effect on the molecular weight and the $CO_2$ retention of the poly(alkylene carbonate) polyol. In each process the choice of the ratio of starting reactants and catalysts resulted in an upper limit on the molecular weight of the poly(alkylene carbonate) polyol which can be prepared. Furthermore, the products of such processes are of relatively low molecular weight and have a broad molecular weight range, that is, they have a high poly-dispersity index and are often contaminated with unreacted starting materials and relatively low molecular weight reaction intermediates. Moreover, the particular reactant ratio and catalyst used has a significant effect on the amount of carbon dioxide moieties in the backbone of the chain.

What is needed is a process for preparing higher molecular weight poly(alkylene carbonate) polyahls beyond the limitations imposed by the stoichiometry and catalyst used at reasonable reaction rates and free of low molecular weight contaminants. What is also needed is a process for making higher molecular weight poly(alkylene carbonate) polyahls with a relatively low poly-dispersity index. What is further needed is a process which allows the preparation of poly(alkylene carbonate) polyahls with higher carbon dioxide contents.

SUMMARY OF THE INVENTION

The invention is a process for increasing the molecular weight of a poly(alkylene carbonate) polyahl which comprises exposing the poly(alkylene carbonate) polyahl to elevated temperatures and at a pressure at which at least one compound other than a monoalkylene glycol is removed in the gaseous state from the poly(alkylene carbonate) polyahl under conditions such that the molecular weight of the poly(alkylene carbonate) polyahl is increased. The compound or compounds being removed in the gaseous state are at least as volatile as a tetraethylene glycol. Exemplary compounds being removed include volatile dialkylene glycols, trialkylene glycols and initiator segments of the poly(alkylene carbonate) polyahl.

This process allows the preparation of higher molecular weight poly(alkylene carbonate) polyahls at faster rates and higher purity than previously prepared in the art. Furthermore, the process allows a great deal of flexibility in the preparation of such polyahls with varying degrees of molecular weight. The poly(alkylene carbonate) polyahls prepared by this process generally have an increased weight percent of carbon dioxide moieties in the backbone of the polymer, and have a lower poly-dispersity index.

DETAILED DESCRIPTION OF THE INVENTION

The starting materials in the process of this invention are poly(alkylene carbonate) polyahls. Poly(alkylene carbonate) polyahls are randomized polymers having a plurality of carbonate moieties and a plurality of active hydrogen moieties and optionally other moieties such as di- and higher polyalkyleneoxy units. An alkylene carbonate moiety is a repeating unit which has an alkylene group bound to a carbonate moiety. An active hydrogen moiety is a moiety containing a hydrogen atom which because of its position in the moiety displays significant activity according to the Zerewitnoff test described by Kohle in the *Journal of American Chemical Society*, Vol. 49, p. 3181 (1927). Illustrative of such active hydrogen moieties are $-COOH$, $-OH$, $-NH_2$, $-NH-$, $-CONH_2$, $-SH$ and $-CONH-$. Alkyleneoxy moiety refers herein to a repeating unit which has an alkylene group bound to oxygen. Alkylene carbonate and alkyleneoxy moieties are respectively represented by the following formulae:

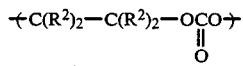

and

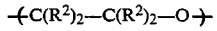

wherein $R^2$ is as hereinafter defined. A dialkylene glycol refers herein to two alkylene moieties connected by an oxygen and terminated by a hydroxyl group, wherein the alkylene moieties can be substituted with a hydrocarbyl moiety. Preferred dialkylene glycol moieties correspond to the formula $$HO-C(R^2)_2-C(R^2)_2-O-C(R^2)_2-C(R^2)_2-OH$$

wherein $R^2$ is as hereinafter defined. Examples of preferred dialkylene glycols include dipropylene glycol, diethylene glycol, 1,2-dibutylene glycol, 2,3-dibutylene glycol, and the like.

Preferred poly(alkylene carbonate) polyahls are random polyols represented by the formula:

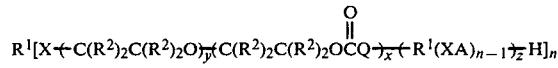

wherein $R^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH, $$-\overset{O}{\underset{\|}{C}}O-, \quad -O\overset{O}{\underset{\|}{C}}O-, \quad \text{or} \quad -O\overset{O}{\underset{\|}{C}}NH-;$$

A is separately in each occurrence

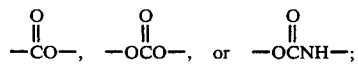

or combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class of poly(alkylene carbonate) polyahls are poly(alkylene carbonate) polyols generally corresponding to the aforementioned formula wherein $R^1$, $R^2$, and n are as previously defined; X is oxygen; x is separately in each occurrence an integer of from 2 to 10; y is separately in each occurrence an integer of from 5 to 15; and z is an integer of from 0 to 2; provided that the ratio of y to x is from 1:1 to 3:1.

In the hereinbefore-defined formulae, $R^1$ is preferably an aliphatic or cycloaliphatic hydrocarbon containing one or more oxygen, nitrogen or sulfur moieties; $R^1$ is more preferably an n-valent alkane or cycloalkene, or an n-valent alkane or cycloalkane containing one or more oxygen, nitrogen or sulfur moieties; $R^1$ is even more preferably an n-valent $C_{1-10}$ alkane or an n-valent $C_{1-10}$ alkane substituted with one or more oxygen moieties. $R^2$ is preferably hydrogen, $C_{1-20}$ alkyl, $C_{1-20}$ haloalkyl, $C_{1-20}$ alkenyl or phenyl; $R^2$ is more preferably hydrogen, $C_{1-3}$ alkyl, $C_{2-3}$ alkenyl, or phenyl; $R^2$ is even more preferably hydrogen, methyl or ethyl; $R^2$ is even more preferably hydrogen or methyl, and, most preferably, hydrogen. X is preferably S, O or NH; X is most preferably O. Preferably, n is an integer of 1 to 10, inclusive; more preferably, 1 to 5, inclusive; and, most preferably, 1 or 2.

Another preferred class of poly(alkylene carbonate) polyahls useful as starting materials for the process of this invention are polyahls formed by reacting a poly(alkylene carbonate) polyahl with a less than stoichiometric amount of a polyisocyanate. These materials have active hydrogen end groups. Their backbones contain the residue of the polyisocyanate that has been completely reacted with active hydrogen compounds. For example, when the active hydrogen end group on the polyahl is hydroxyl, urethane moieties are formed in the polyahl backbone. When the active hydrogen end group on the polyahl is amino, urea moieties are formed in the polyahl backbone.

As used herein, the term "polyahl" includes any polyfunctional compound having on average more than 1 active hydrogen moiety as defined hereinbefore. Specifically included within the definition of polyahl are polyols, polyamines, polyamides, polymercaptans and polyacids. Examples of polyahls suitable for use in the instant invention may be found in U.S. Pat. No. 4,465,713 at column 2, line 42 through column 5, line 17.

Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalyst or metal salt of an alkaline compound. Examples of these poly(alkylene carbonate) polyols and methods for preparation of these polyols are contained in Maximovich (U.S. Pat. No. 3,896,090), Maximovich (U.S. Pat. No. 3,689,462), Springmann (U.S. Pat. No. 3,313,782), Stevens (U.S. Pat. No. 3,248,416), Stevens (U.S. Pat. No. 3,248,415), and Stevens (U.S. Pat. No. 3,248,414) and copending application Ser. No. 750,362, all incorporated herein by reference. Alternatively, the poly(alkylene carbonate) polyols can be prepared by reacting a dialkyl carbonate or diaryl with an initiator with two or more hydroxyl moieties. See, for example, U.S. Pat. No. 4,476,293 and U.S. Pat. No. 4,191,705, incorporated herein by reference.

The poly(alkylene carbonate) polyahls used as starting materials may also contain the residue of an initiator as well as unreacted starting materials and other relatively volatile reaction products.

Alternatively, the poly(alkylene carbonate) polyahls can be prepared by reacting a dialkyl carbonate or diaryl with an initiator with two or more active hydrogen moieties. See, for example, U.S. Pat. Nos. 4,476,293 and 4,191,705, incorporated herein by reference.

Alkylene carbonates useful in the reaction are those which will react with the reactive hydrogen-containing functional groups. Desirable alkylene carbonates are those corresponding to the formula

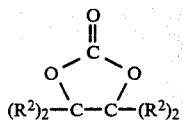

wherein $R^2$ is as previously defined.

Dialkyl carbonates useful in this invention include those corresponding to the formula

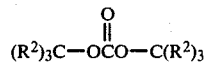

and more preferably,

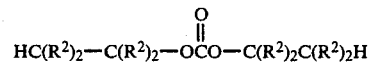

wherein $R^2$ is as previously defined.

$R^2$ is preferably hydrogen, or a $C_{1-20}$ alkyl, $C_{1-20}$ haloalkyl, $C_{1-20}$ alkenyl or phenyl. $R^2$ is more preferably hydrogen, or a $C_{1-3}$ alkyl, $C_{2-3}$ alkenyl or phenyl radical. $R^2$ is most preferably hydrogen, or a methyl or ethyl.

Examples of desirable alkylene carbonates include ethylene carbonate, propylene carbonate, butylene carbonate, vinylene carbonate and phenylene carbonate. More preferred alkylene carbonates include ethylene and propylene carbonate. Examples of preferred dialkyl carbonates include dimethyl carbonate, diethyl carbonate and dipropyl carbonate. A preferred diaryl carbonate is diphenyl carbonate.

Epoxides useful for preparing starting materials for this invention are those which will react with $CO_2$ or the functional group on an organic compound wherein the functional group contains an active hydrogen so as to add an ether and carbonate unit to the organic compound.

Desirable epoxides include those corresponding to the formula

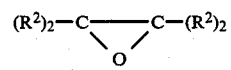

wherein $R^2$ is as defined above.

Among desirable epoxides are the alkylene oxides, for instance ethylene oxide, propylene oxide, butylene oxide; epihalohydrins, such as epibromohydrin and epichlorohydrin; styrene oxide, vinylene oxide, cyclohexene oxide; cyclopentene oxide, cycloheptene oxide, 2,3-epoxy propylphenyl ether and tert-butyl glycidyl ether. Among preferred epoxides are ethylene oxide, propylene oxide, butylene oxide, epichlorohydrin, epibromohydrin, styrene oxide and vinylene oxide.

The organic compound containing active hydrogen atoms (the initiator) is a hydrocarbon or hydrocarbon which is substituted with one or more heteroatoms of oxygen, nitrogen or sulfur containing between 1 and 25 functional groups containing a reactive hydrogen. Among the desirable initiators are those which correspond to the formula

wherein $R^3$, X and n are as hereinbefore defined. A functional group containing a reactive hydrogen means herein any moiety which contains a hydrogen atom which will readily react with an alkylene carbonate, a dialkyl carbonate, diaryl carbonate or an alkylene oxide in the presence of carbon dioxide. More specifically, reactive hydrogen means herein a hydrogen linked directly to an oxygen, nitrogen or sulfur atom, such as is found in a hydroxy, non-tertiary amine, amide, mercapto or carboxyl group.

The organic compounds containing active hydrogen atoms of this invention (the initiator) contain one or more of the following functional groups, hydroxyls, amines, mercaptans, carboxyls, sulfones, amides, imides, or carbonates. In addition, the initiators may contain other groups in their backbone structure, such as, sulfones, sulfoxides, sulfides, amines, amides, ethers, esters, carbonates and the like.

Among desirable initiators are polyols such as aliphatic polyether and polyester polyols, cycloaliphatic polyols, aromatic polyols and polyols which further contain oxy or ether groups; polyamines; polymercaptans; polyamides; polycarboxylic acids; water, alkylolamines and organic compounds which contain two or more of the above-described functional groups containing reactive hydrogens. The preferred classes are the polyols, polyamines and polymercaptans. Examples of active hydrogen-containing compounds include those described in the U.S. patents incorporated by reference hereinbefore. Two or more initiators can be used in combination to obtain a poly(alkylene carbonate) polyol.

Catalysts used in the preparation of polyether polyols include alkali metal hydroxides, alkaline earth metal hydroxides, alkali metal carbonates, alkaline earth metal carbonates, ammonium hydroxide and ammonium carbonate.

Preferable catalysts for the reaction of an active hydrogen-containing organic compound with an alkylene carbonate, dialkyl carbonate, diaryl carbonate, alkylene oxide and carbon monoxide, or alkylene carbonate in admixture with an alkylene oxide and/or carbon dioxide include ester exchange catalysts. Among preferable catalysts are such metals as lithium, sodium, potassium, rubidium, cesium, magnesium, calcium, strontium, barium, zinc, aluminum, titanium, cobalt, germanium, tin, lead, antimony, arsenic and cerium as well as the alkoxides thereof. Examples of other preferable catalysts are alkali metal carbonates, alkaline earth metal carbonates, ammonium carbonates, alkali metal borates, alkaline earth metal borates, ammonium borates, hydrocarbyloxy titanates, zinc borate, lead borate, zinc oxide, lead silicate, lead arsenate, litharge, lead carbonate, antimony trioxide, germanium dioxide, cerium trioxide and aluminum isopropoxide. Examples of other preferable catalysts include salts of organic acids of magnesium, calcium, cerium, barium, zinc and titanium, alkali metal stannates, alkaline metal stannates and ammonium stannates.

Examples of borate catalysts include sodium metaborate, sodium meta-borate tetrahydrate, sodium metaborate dihydrate, sodium pentaborate pentahydrate, sodium tetraborate decahydrate, sodium tetraborate pentahydrate, diammonium tetraborate tetrahydrate, ammonium hydrogen tetraborate tetrahydrate, lithium ortho-dihydroborate, lithium meta-borate, lithium tetraborate, lithium pentaborate pentahydrate, potassium meta-borate, potassium tetraborate tetrahydrate, potassium tetraborate pentahydrate, potassium pentaborate tetrahydrate, magnesium meta-borate trihydrate, magnesium diborate, magnesium ortho-borate, calcium meta-borate, calcium tetraborate and strontium tetraborate tetrahydrate. Examples of stannate catalysts include sodium stannate trihydrate, potassium stannate trihydrate, potassium stannate monohydrate, barium stannate trihydrate, magnesium stannate trihydrate and the like.

More preferred catalysts are the alkali metal carbonates, alkaline earth metal carbonates, ammonium carbonates, alkali metal stannates, alkaline earth metal stannates, alkali metal borates, alkaline earth metal borates and ammonium borates. Even more preferred catalysts are alkali metal carbonates, alkali metal borates and alkali metal stannates. Most preferred catalysts are potassium carbonate, sodium meta-borate and sodium stannate.

The choice of catalyst affects the percentage of carbon dioxide units in the poly(alkylene carbonate) polyol. Generally, the poly(alkylene carbonate) polyol contains between about 5 and 35 weight percent of the carbon dioxide. The use of most of the catalysts described hereinbefore results in a poly(alkylene carbonate) polyol in which about 10 percent of the units are carbon dioxide units, whereas the use of sodium metaborate results in about 25 percent carbon dioxide units, and the use of sodium stannate results in about 30 to 50 percent carbon dioxide units. In this context, percent means the percentage of the carbon dioxide units based on the total of the carbon dioxide units and the alkyleneoxy units.

A suitable amount of the catalyst is any amount which is catalytic under the reaction conditions. Preferable catalyst concentrations are between about 0.01 and 5 percent by weight based upon the reactants, more preferably between about 0.01 to 1.0 percent by weight, and most preferably 0.05 to 0.1 percent by weight.

It is preferred to remove the catalysts used to prepare the starting poly(alkylene carbonate) polyahls prior to the performance of the present process, as such catalysts can result in the decomposition of the poly(alkylene carbonate) polyahls at the temperatures used in this process. While trace amounts of such catalysts can be present without significant decomposition, the bulk of the catalyst used to prepare the starting poly(alkylene carbonate) polyahls is removed prior to the advancement process of this invention. The combination of short reaction times in the presence of very low catalyst levels allows high molecular weight build with minimal decomposition. Catalyst can be removed conveniently by the method of U.S. Pat. No. 4,528,364.

When poly(alkylene carbonate) polyahls having urea, urethane or similar isocyanate/ahl reaction moieties are desired, a poly(alkylene carbonate) polyahl as hereinbefore defined is reacted with less than a stoichiometric amount of a polyisocyanate by adding the polyisocyanate to the poly(alkylene carbonate) polyahl in a stirred reactor at ambient or slightly elevated temperatures.

The polyisocyanates suitable for such reactions include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane, (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'-and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Pat. Nos. 874,430 and 848,671, perchlorinated aryl polyisocyanates of the type described in German Auslegeschrift No. 1,157,601, polyisocyanates containing carbodiimide groups of the type described in German Pat. No. 1,092,007, diisocyanates of the type described in U.S. Pat. No. 3,492,330, polyisocyanates containing allophanate groups of the type described, for example, in British Pat. No. 994,890, in Belgian Pat. No. 761,626 and in published Dutch Patent Application No. 7,102,524, polyisocyanates containing isocyanurate groups of the type described in German Pat. Nos. 1,022,789; 1,222,067 and 1,027,394 and in German Offenlegungsschrift Nos. 1,929,034 and 2,004,048, polyisocyanates containing urethane groups of the type described, for example, in Belgian Pat. No. 752,261 or in U.S. Pat. No. 3,394,164, polyisocyanates containing acrylated urea groups as described in German Pat. No. 1,230,778, polyisocyanates containing biuret groups of the type described, for example, in German Pat. No. 1,101,392, in British Pat. No. 889,050 and in French Pat. No. 7,017,514, polyisocyanates obtained by telomerization reactions of the type described, for example, in Belgian Pat. No. 723,640, polyisocyanates containing ester groups of the type described, for example, in British Pat. Nos. 965,474 and 1,072,956, in U.S. Pat. No. 3,567,763 and in German Pat. No. 1,231,688 and reaction products of the aforementioned isocyanates with acetals as described in German Pat. No. 1,072,385.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in *Justus Liebigs Annalen der Chemie*, 562, pp. 75–136, and in U.S. Pat. Nos. 3,284,479; 4,089,835; 4,093,569; 4,221,876; 4,310,448; 4,359,550 and 4,495,309.

One class of particularly useful polyisocyanates are the aromatic polyisocyanates such as 2,4- and 2,6-tolylene diisocyanate and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst.

The products of this process are poly(alkylene carbonate) polyahls with higher molecular weights than the starting poly(alkylene carbonate) polyahls. The molecular weights of the poly(alkylene carbonate) polyahls prepared by this process can be any molecular weight desired which is above the starting molecular weight. Preferable molecular weights are between about 500 and 10,000, with most preferred molecular weights being between 1,000 and 8,000. The products prepared have a poly-dispersity index ($M_w/M_n$), either only slightly higher or in some cases even lower than the starting poly(alkylene carbonate) polyahls. Poly-dispersity indexes are known to increase with increasing molecular weight in step growth polymerization. The products prepared contain a higher weight percent of $CO_2$ in the backbone than the starting materials. Unreacted starting materials and low molecular weight reaction products produced during the preparation of the starting poly(alkylene carbonate) polyahls are removed.

The process of this invention generally involves exposing a poly(alkylene carbonate) polyahl to elevated temperatures under reduced pressure conditions so as to cause the splitting off of a dialkylene glycol moiety, a trialkylene glycol moiety and/or a moiety which is as volatile or more volatile than the dialkylene glycol or trialkylene glycol moiety and removing such volatile components from the reaction mass. Generally, the dialkylene glycol and/or initiator will volatilize. Depending on the degree of rectification used, and the $CO_2$ content, less volatile components may come off, such as the trialkylene glycols. If the poly(alkylene carbonate) polyahl starting material contains no dialkylene glycol units, the trialkylene glycol units can be removed by this process. In general, the lightest fraction which splits from the starting material will be taken off. In those embodiments wherein the poly(alkylene carbonate) polyahl is a monofunctional species, that is, where the initiator has only one active hydrogen site, under certain circumstances the initiator fragment may be more volatile than the dialkylene glycol fragment and therefore will split off and be removed more readily than the dialkylene glycol portion. When the initiator is a linear $C_{1-8}$ alcohol, the $C_{1-8}$ alcohol fragment will be removed before any dialkylene glycol fragments will be removed. Where a linear $C_{10}$ or $C_{11}$ alcohol is used as the initiator, the linear $C_{10}$ or $C_{11}$ alcohol is about as volatile as the dialkylene glycol and therefore should come off at the same time. Wherein a linear $C_{12}$ or greater alcohol is the initiator, the dialkylene glycol is more volatile and will split off. Branched alcohol initiators have somewhat different volatilities and will be split out based on its relative volatility as compared to the dialkylene or trialkylene glycol fragment.

The volatile component can be removed by any method known in the art. Such methods include fractional distillation, fractionation, passing an inert gas over the reaction mass so as to remove the volatile species, and any other method for removing the volatile species condensed by a water-chilled condenser as is known in the art, for example, a falling film still such as a wiped film evaporator is particularly useful. A preferred method of condensing the distillate is by the use of a water-chilled condenser. The majority of the volatile components present such as acetone and water, both introduced during catalyst removal, and dioxane, small quantities of which can be present due to decomposition, pass through the water-chilled condenser under the reduced pressure conditions employed and can be condensed using a dry ice condenser. The volatile species condensed by the water-chilled condenser can be recycled to be used as initiators for the preparation of poly(alkylene carbonate) polyahls useful as starting materials in this process.

The process of this invention takes place at any temperature at which the splitting off of the volatile segments occurs. The lower temperature limit is that temperature at which the splitting of the volatile component occurs, and the upper limit is that temperature at which the poly(alkylene carbonate) polyahl undergoes decomposition. Preferred temperatures are between about 150° C. and 300° C. More preferred temperatures are between about 175° C. and 260° C., with between about 200° C. and 250° C. being most preferred.

Pressures used in this process are those pressures at which the dialkylene glycol or species as volatile or more volatile than dialkylene glycol will volatilize at the temperatures used. Preferable pressures are atmospheric and subatmospheric, with subatmospheric pressures being more preferable. More preferable pressures are less than about 300 mm Hg, even more preferably less than about 100 mm Hg, even more preferably less than about 50 mm Hg, and most preferably between 10 and 30 mm Hg.

It is preferred to remove the catalysts used to prepare the poly(alkylene carbonate) polyahls prior to the performance of this process, as such catalysts can result in the decomposition of the poly(alkylene carbonate) polyahls at the temperatures used in this process. Trace amounts of such catalysts can be present without significant decomposition. The bulk of the catalyst is removed prior to the advancement process. The combination of short reaction times in the presence of very low catalyst levels allows high molecular weight build with minimal decomposition.

The reaction time for the process of this invention is variable depending on various factors, including temperature, pressure, and the molecular weight of the desired product. At lower pressures, and higher temperatures, the time to achieve the desired molecular weight is lower. The process can be run for a time sufficient to give the desired molecular weight. Reaction times are relatively rapid, only a few hours are required in most cases.

The process of this invention is generally performed by exposing the poly(alkylene carbonate) polyahl in neat form to the processing conditions. The process can be performed in a solvent, although performing the process in neat form is preferred. Solvents useful include inert organic solvents with a boiling point above that of the dialkylene glycol, or the most volatile species.

SPECIFIC EMBODIMENTS

The following examples are included for illustrative purposes only, and do not limit the scope of the invention or the claims. Unless otherwise stated, all parts and percentages are by weight.

The molecular weights and distribution are determined by size exclusion chromatography on Waters Ultrastyragel ® 1000 Å and 10,000 Å columns in series using tetrahydrofuran (THF) as the mobile phase and calibrated with narrow molecular weight poly(ethylene glycol) standards.

The Brookfield viscosities are all measured at ambient temperature using an LV4 spindle at the appropriate spin rate.

EXAMPLE 1

Part A:

A 5:1 mole ratio of ethylene carbonate:diethylene glycol is heated with stirring under a nitrogen atmosphere for 7 hours at 150° C. using 1.0 percent $Na_2SnO_3.3H_2O$ as catalyst to give a 98 percent ethylene carbonate conversion; with product containing 23.1 percent carbon dioxide.

Part B:

The product (20 percent in acetone) of Part A is stirred with Florisil (1 g/10-g product) for 3 hours to remove catalyst, followed by filtration to remove catalyst and concentration to remove acetone. A sample (91.3 g) is placed in a two-necked 100 ml boiling flask and several boiling stones are added. The flask is equipped with a thermometer and heating mantle and attached to a distilling apparatus connected to a vacuum source through a dry ice-isopropanol trap, and subjected to fractionation.

The maximum pot temperature is 185° C. The pressure is maintained between 0.5 to 1.0 mm Hg. Distillate (24.0 g) is recovered (92 percent diethylene glycol and 7 percent ethylene carbonate). The residue is a light amber viscous liquid, with 29.0 percent carbon dioxide. The results are compiled in Table I.

EXAMPLE 2

Part A:

A 10:1 mole ratio of ethylene carbonate:monoethylene glycol is heated with stirring under a nitrogen atmosphere for 24 hours at 135° C. using 1.0 percent $Na_2SnO_3.3H_2O$ as catalyst to give a 100 percent ethylene carbonate conversion to a poly(alkylene carbonate) polyol with 25.8 percent carbon dioxide.

Part B:

The polyol (20 percent in acetone) is stirred with Florisil (1 g/10 g polyol) for 2 hours to remove catalyst, followed by filtration and concentration. A sample (89.8 g) of this polyol is subjected to fractionation at a maximum pot temperature of 194° C. and a pressure of 0.5 to 1.0 mm Hg. Distillate (21.2 percent) is recovered (3 percent monoethylene glycol, 86 percent diethylene glycol and 6 percent triethylene glycol). The residue is a light amber viscous liquid, with 32.1 percent carbon dioxide. The results are compiled in Table I.

EXAMPLE 3

Part A:

A 15:1 mole ratio of ethylene carbonate:diethylene glycol is heated with stirring under a nitrogen atmosphere for 8 hours at 150° C. using 1.0 percent $Na_2SnO_3.3H_2O$ as catalyst to give 95.7 percent ethylene carbonate conversion to a poly(alkylene carbonate) polyol with 21.8 percent carbon dioxide.

Part B:

The catalyst is removed as in Example 1. A sample (73.0 g) of the polyol of Part A is subjected to fractionation with a maximum pot temperature of 210° C. and a pressure of 0.5 to 0.8 mm Hg to give a 20.7 percent distillate of 25 percent ethylene carbonate, 73 percent diethylene glycol and 1 percent monoethylene glycol. The residue is a light amber viscous liquid with 30.8 percent carbon dioxide. The results are compiled in Table I.

EXAMPLE 4

Part A:

A 50:1 mole ratio of ethylene carbonate:monoethylene glycol is heated with stirring under a nitrogen atmosphere for 88 hours at 135° C. using 0.2 percent $Na_2SnO_3.3H_2O$ as catalyst to give 96.6 percent ethylene carbonate conversion to a poly(alkylene carbonate) polyol with 27.6 percent carbon dioxide.

Part B:

The catalyst is removed as in Example 1. A sample (184.4 g) of the polyol of Part A is subjected to fractionation with a maximum pot temperature of 210° C. and a pressure of about 1.3 mm Hg to give an 8.0 percent distillate of 71.5 percent ethylene carbonate and 25.3 percent diethylene glycol. The residue is a light amber viscous liquid with 29.3 percent carbon dioxide. The ate are removed from the reactor by distillation. The residue is a poly(alkylene carbonate) polyol which is a liquid with 27.7 percent carbon dioxide.

Part B:

The catalyst is removed as in Example 2. A sample (97.2 g) of the polyol of Part A is subjected to fractionation at a maximum pot temperature of 215° C. and a pressure of 0.3 to 2.0 mm Hg to give a 9.5 percent distillate. The residue is a light amber viscous liquid with 33.4 percent carbon dioxide. The results are compiled in Table I.

TABLE I

| Example | Portion of Reactants | Advancement Conditions | Advanced | %[1] Residue | %[2] $CO_2$ | Tg (°C.) | Molecular Weight Data[3] | | | |
|---|---|---|---|---|---|---|---|---|---|---|
| | | | | | | | Peak | $\overline{Mn}$ | $\overline{Mw}$ | PDI |
| 1A | EC:DEG = 5:1 | | No | — | 23.1 | −57.3 | 526 | 423 | 756 | 1.786 |
| 1B | | 185° C/1 mm | Yes | 70.3 | 29.0 | −24.6 | 4255 | 2146 | 3749 | 1.757 |
| 2A | EC:MEG = 10:1 | | No | — | 25.8 | −47.9 | 1050 | 630 | 1126 | 1.787 |
| 2B | | 194° C/1 mm | Yes | 78.8 | 32.1 | −19.3 | 6861 | 3077 | 5829 | 1.894 |
| 3A | EC:DEG = 15:1 | | No | — | 21.8 | −45.1 | 1393 | 792 | 1449 | 1.830 |
| 3B | | 210° C./0.7 mm | Yes | 79.3 | 30.8 | −23.2 | 6219 | 2840 | 4892 | 1.722 |
| 4A | EC:MEG = 50:1 | | No | — | 27.6 | −34.3 | 3485 | 1636 | 3624 | 2.218 |
| 4B | | 210° C./1.3 mm | Yes | 90.2 | 29.3 | −19.4 | 6219 | 2889 | 4663 | 1.614 |
| 5A | EC:MEG = 100:1 | | No | — | 26.9 | −29.1 | 5126 | 2286 | 5343 | 2.358 |
| 5B | | 227° C./1.5 mm | Yes | 87.3 | 30.0 | −13.9 | I | I | I | I |
| 6A | DEG:DEC ~2 | | No | — | 27.7 | −56.7 | 734 | 540 | 878 | 1.626 |
| 6B | | 215° C/2 mm | Yes | 79.2 | 33.4 | −16.6 | 5646 | 2614 | 4608 | 1.763 |

[1] $\frac{\text{Wt residue after advancement}}{\text{Wt PAC polyol before advancement}} \times 100$
[2] Nuclear magnetic resonance procedure using DMSO as internal standard
[3] I = Insoluble in THF, hydroxy equivalent weight was 3667

TABLE IA

| | Capillary Gas Chromatographic Analysis of Examples 1B to 4B | | | | | | | |
|---|---|---|---|---|---|---|---|---|
| | EC:Diol | | | Assay (%) | | | | |
| Example | Mole Ratio | Diol | Advanced | Dioxane | MEG | DEG | TEG | EC |
| 1B | 5 | DEG | Yes | — | 0.40 | — | — | — |
| 2A | 10 | MEG | No | — | 0.72 | 6.70 | >0.56 | 1.84 |
| 2B | 10 | MEG | Yes | — | 0.51 | — | — | — |
| 3B | 15 | DEG | Yes | — | 0.46 | — | — | — |
| 4A | 50 | MEG | No | — | 0.20 | 0.18 | — | 4.64 |
| 4B | 50 | MEG | Yes | — | 0.25 | — | — | — | results are compiled in Table I.

EXAMPLE 5

Part A:

A 100:1 mole ratio of ethylene carbonate:monoethylene glycol is heated with stirring under a nitrogen atmosphere for 121 hours at 135° C. using 0.1 percent $Na_2SnO_3.3H_2O$ as catalyst to give 92.5 percent ethylene carbonate conversion to a poly(alkylene carbonate) polyol with 26.9 percent carbon dioxide.

Part B:

The catalyst is removed as in Example 1. A sample (72.7 g) of the polyol of Part A is subjected to fractionation with a maximum pot temperature of 227° C. and a pressure of about 1.5 mm Hg to give a 9.4 percent distillate of 46.3 percent ethylene carbonate, 36.9 percent diethylene glycol and 6.9 percent triethylene glycol. The residue is a light amber viscous liquid with 30.0 percent carbon dioxide. The results are compiled in Table I.

EXAMPLE 6

Part A:

A 1:2 mole ratio of diethyl carbonate:diethylene glycol is heated with stirring under a nitrogen atmosphere using 1.0 percent $Na_2SnO_3.3H_2O$ as catalyst. The pot temperature is allowed to increase from 122° C. to 187° C. during which time ethanol and some diethyl carbon- Example 1 shows that advancement of a 5:1 product can increase the molecular weight beyond that of a 50:1 product while reducing the poly-dispersity index. This is accomplished in only a fraction of the time required to make a 50:1 product. Example 2 shows that advancement of a 10:1 product can increase the molecular weight beyond that of a 100:1 product while reducing the poly-dispersity index. This is accomplished in only a fraction of the time required to make a 100:1 product, while removing volatile impurities. Example 3 shows that advancement of a 15:1 product can increase the molecular weight by more than three-fold while maintaining a low poly-dispersity index. Example 4 shows that advancement of a 50:1 product can increase the molecular weight to about that of a 100:1 product but at greatly reduced poly-dispersity index and with removal of volatile impurities. Example 5 shows that the advancement of a 100:1 product can produce a high molecular weight, high purity product with a Tg of −13.9. Example 6 shows that advancement of a 2:1 DEG:DEC product can increase the molecular weight to about that of a 100:1 product but at a greatly reduced poly-dispersity index and at much higher reaction rates.

EXAMPLE 7

Part A:

A 10:1 mole ratio of ethylene carbonate and diethylene glycol is heated with stirring under a nitrogen atmosphere for 3 hours at 175° C. using 0.5 percent $Na_2SnO_3.3H_2O$ as catalyst to give 97.5 percent ethylene carbonate conversion to a poly(alkylene carbonate) polyol with 23.7 percent carbon dioxide. The catalyst is removed as in Example 1.

Part B:

A sample (1069.6 g) of the polyol of Part A is subjected to fractional distillation for 2.5 hours with a maximum pot temperature of 237° C. and a pressure of 10 mm Hg. Distillate is collected in a water-chilled condenser (~15° C.) and a dry ice-isopropanol trap (~ −78° C.). The distillate collected at 15° C. accounts for 16.7 percent (179.1 g) of the sample charged and has the following assay: 0.30 percent monoethylene glycol, 1.51 percent dioxane, 10.49 percent ethylene carbonate, 76.21 percent diethylene glycol, 10.04 percent triethylene glycol, 0.70 percent tetraethylene glycol and 0.05 percent water (99.4 percent total). The distillate collected at −78° C. accounts for 4.9 percent (51.9 g) of the sample charged and has the following assay: 60.23 percent acetone, 24.97 percent dioxane and 8.8 percent water (94.0 percent total). The residue is a light amber viscous liquid with 29.5 percent carbon dioxide, accounts for 77.4 percent (828.2 g) of the sample charged and has the properties shown below:

| Advanced | % Residue | % $CO_2$ | Molecular Weight Data | | |
|---|---|---|---|---|---|
| | | | $\overline{Mn}$ | $\overline{Mw}$ | PDI |
| No | — | 23.7 | 643 | 1230 | 1.840 |
| Yes | 77.4 | 29.5 | 2372 | 5463 | 2.303 |

Example 7 shows scale-up data on a preferred method using a 10:1 product. Reaction rates are rapid; complete distillate analysis is given.

EXAMPLE 8

Part A:

A 10:1 mole ratio of ethylene carbonate to diethylene glycol is heated with stirring under a nitrogen atmosphere for 24 hours at 135° C. using 0.5 percent $Na_2SnO_3\ 3H_2O$ as catalyst to give 91.6 percent ethylene carbonate conversion to a poly(alkylene carbonate) polyol with 21.3 percent carbon dioxide. The catalyst is removed as in Example 1.

Part B:

A sample (525.8 g) of the polyol of Part A is subjected to fractional distillation for 2.5 hours with a maximum pot temperature of 235° C. and a pressure of 10 mm Hg. Additional samples are subjected to fractional distillation to higher pot temperatures and a pressure of 10 mm Hg. The results are given in Table II.

TABLE II

| Advancement Conditions | Advanced | % Residue | % Distillate | % $CO_2$ | Molecular Weight Data[1] | | | |
|---|---|---|---|---|---|---|---|---|
| | | | | | HMw | Mn | Mw | PDI |
| starting material | No | — | — | 21.3 | — | 655 | 1154 | 1.761 |
| 235° C./10 mm | Yes | 71.9 | 27.7 | 31.1 | 1941 | 1938 | 3958 | 2.042 |
| 249° C./10 mm | Yes | 71.1 | 28.2 | 29.8 | 2250 | 2113 | 4609 | 2.180 |
| 262° C./10 mm | Yes | 69.8 | 29.4 | 29.1 | 2770 | I | I | I |
| 275° C./10 mm | Yes | 67.7 | 30.3 | 25.4 | 3886 | I | I | I |

[1] I = Insoluble in tetrahydrofuran, HMw = Hydroxyl molecular weight

Example 8 shows the effects of final pot temperature on molecular weight build and $CO_2$ content. High $CO_2$ content is retained in the product even at 275° C.

EXAMPLE 9

Part A:

A diethylene glycol initiated adduct is made from ethylene oxide and carbon dioxide at 175° C. using sodium stannate trihydrate as catalyst. The catalyst is removed by the process described in Example 1. The residue is a poly(alkylene carbonate) polyol with 17.8 percent carbon dioxide.

Part B:

A sample (516.5 g) of the polyol of Part A is subjected to fractional distillation for 2.5 hours with a maximum pot temperature of 235° C. and a pressure of 10 mm Hg. Distillate is collected in a water-chilled condenser (~15° C.) and a dry ice-isopropanol trap (~ −78° C.) The distillate collected at 15° C. accounts for 31.2 percent (161.3 g) of the sample charged and has the following assay: 0.44 percent monoethylene glycol, 0.90 percent dioxane, 6.66 percent ethylene carbonate, 73.7 percent diethylene glycol, 15.19 percent triethylene glycol, 1.29 percent tetraethylene glycol and 0.02 percent water (98.2 percent total). The distillate collected at −78° C. accounts for 0.7 percent (3.4 g) of the sample charged and has the following assay: 2.36 percent acetone, 85.73 percent dioxane and 2.6 percent water (90.7 percent total). The residue is an amber viscous liquid with 20.9 percent carbon dioxide, accounts for 67.1 percent (346.6 g) of the sample charged and has the properties shown below:

| Advanced | % Residue | % $CO_2$ | Molecular Weight Data | | | |
|---|---|---|---|---|---|---|
| | | | Peak | $\overline{Mn}$ | $\overline{Mw}$ | PDI |
| No | — | 17.8 | 621 | 428 | 671 | 1.560 |
| Yes | 67.1 | 20.9 | 4365 | 1973 | 4141 | 2.098 |

Example 9 shows scale-up data on a preferred method using a product made from ethylene oxide and carbon dioxide. Reaction rates are rapid to give a high molecular weight product with a relatively low polydispersity index (compare to 50:1 product).

EXAMPLE 10

Part A:

A 10:1 mole ratio of ethylene carbonate to polyglycol P-425 is heated with stirring under a nitrogen atmosphere for 6 hours at 175° C. using 0.5 percent sodium stannate trihydrate as catalyst to give 98 percent ethylene carbonate conversion to a poly(alkylene carbonate) polyol with 10.8 percent carbon dioxide. The catalyst is removed as in Example 1.

Part B:

A sample (81.8 g) is subjected to fractional distillation with a maximum pot temperature of 235° C. and a pressure of 10 mm Hg. Distillate is collected in a water-chilled condenser (~15° C.) and a dry ice-isopropanol trap (~ −78° C.). The distillate collected at 15° C. accounts for 9.8 percent (8.0 g) of the sample charged and has the following assay: 1.02 percent monoethylene glycol, 5.40 percent ethylene carbonate, 76.9 percent diethylene glycol and 8.13 percent triethylene glycol. The distillate collected at −78° C. accounts for 2.5 percent (2.1 g) of the sample charged and has the following assay: 69.1 percent acetone and 24.7 percent dioxane. The residue is a light straw viscous liquid with 12.7 percent carbon dioxide, accounts for 86.8 percent (71.0 g) of the sample charged and has the properties shown below:

| Advanced | % Residue | % $CO_2$ | Molecular Weight Data | | | |
|---|---|---|---|---|---|---|
| | | | Peak | Mn | Mw | PDI |
| No | — | 10.8 | 1323 | 817 | 1562 | 1.91 |
| Yes | 86.8 | 12.7 | 3021 | 1870 | 3891 | 2.08 |

Example 10 shows that a poly(propylene glycol) of 425 molecular weight can be used as initiator. A 10:1 product is rapidly advanced to a high molecular weight product with relatively low poly-dispersity index.

EXAMPLE 11

Part A:
A 10:1 mole ratio of ethylene carbonate to 1,4-butanediol is heated with stirring under a nitrogen atmosphere for 7 hours at 150° C. using 0.5 percent sodium stannate trihydrate as catalyst to give 93 percent ethylene carbonate conversion to a poly(alkylene carbonate) polyol with 19.3 percent carbon dioxide. The catalyst is removed as in Example 1.

Part B:
A sample (92.5 g) of the polyol of Part A is subjected to fractional distillation with a maximum pot temperature of 190° C. and a pressure of 10 mm Hg. Distillate is collected in a water-chilled condenser (∼15° C.) and a dry ice-isopropanol trap (∼−78° C.). The distillate collected at 15° C. accounts for 25.3 percent (23.4 g) of the sample charged and has the following assay: 0.66 percent monoethylene glycol, 17.1 percent 1,4-butanediol, 76.9 percent diethylene glycol and 0.51 percent triethylene glycol. The distillate collected at −78° C. accounts for 11.1 percent (10.3 g) of the sample charged and has the following assay: 22.0 percent acetone and 23.8 percent dioxane. The residue is a light straw viscous liquid with 25.2 percent carbon dioxide, accounts for 52.4 percent (23.4 g) of the sample charged and has the properties shown below:

| Advanced | % Residue | % $CO_2$ | Molecular Weight Data | | | |
|---|---|---|---|---|---|---|
| | | | Peak | Mn | Mw | PDI |
| No | — | 19.3 | 258 | 357 | 489 | 1.37 |
| Yes | 52.4 | 26.2 | 1161 | 819 | 1332 | 1.63 |

Example 11 shows that 1,4-butanediol can be used as initiator. A 10:1 product is rapidly advanced to a much higher molecular weight product. Some of the 1,4-butanediol is present in the distillate.

EXAMPLE 12

Part A:
A 10:1 mole ratio of ethylene carbonate to dipropylene glycol is heated with stirring under a nitrogen atmosphere for 4 hours at 175° C. using 0.5 percent sodium stannate trihydrate as catalyst to give 100 percent ethylene carbonate conversion to a poly(alkylene carbonate) polyol with 14.7 percent carbon dioxide The catalyst is removed as in Example 1.

Part B:
A sample (89.5 g) of the polyol of Part A is subjected to fractional distillation with a maximum pot temperature of 235° C. and a pressure of 10 mm Hg. Distillate is collected in a water-chilled condenser and a dry ice-isopropanol trap. The distillate collected by the water-chilled condenser accounts for 20.2 percent (18.1 g) of the sample charged and has the following assay: 0.91 percent dioxane, 39.4 percent diethylene glycol, 55.8 percent dipropylene glycol and 0.30 percent triethylene glycol. The distillate collected in the dry ice-isopropanol trap accounts for 4.0 percent (3.6 g) of the sample charged and has the following assay: 24.2 percent acetone and 61.3 percent dioxane. The residue is a straw colored viscous liquid with 20.5 percent carbon dioxide, accounts for 71.5 percent (64.0 g) of the sample charged and has the properties shown below:

| Advanced | % Residue | % $CO_2$ | Molecular Weight Data | | | |
|---|---|---|---|---|---|---|
| | | | Peak | Mn | Mw | PDI |
| No | — | 14.7 | 794 | 461 | 870 | 1.89 |
| Yes | 71.5 | 20.5 | 3485 | 1921 | 3817 | 1.99 |

Example 12 shows that dipropylene glycol can be used as initiator. A 10:1 product is rapidly advanced to a molecular weight greater than a 50:1 product. Some of the dipropylene glycol is present in the distillate.

EXAMPLE 13

Part A:
A 10:1 mole ratio of ethylene carbonate to polyester poly (Formrex ® 11-225, a hydroxyl functional diethylene glycol adipate, MW=500, manufactured by Witco) is heated with stirring under a nitrogen atmosphere for 3.5 hours at 175° C. using 0.5 percent sodium stannate trihydrate as catalyst to give 97.3 percent ethylene carbonate conversion to a poly(alkylene carbonate) polyol with 18.7 percent carbon dioxide. The catalyst was removed as in Example 1.

Part B:
A sample (93.2 g) of the polyol of Part A is subjected to fractional distillation with a maximum pot temperature of 235° C. and a pressure of 10 mm Hg. Distillate is collected in a water-chilled condenser and a dry ice-isopropanol trap. The distillate collected by the water-chilled condenser accounts for 10.8 percent (10.1 g) of the sample charged and has the following assay: 0.47 percent dioxane, 12.05 percent ethylene carbonate, 76.8 percent diethylene glycol and 2.85 percent triethylene glycol. The distillate collected in the dry ice-isopropanol trap accounts for 3.4 percent (3.2 g) of the sample charged and has the following assay: 85.0 percent acetone and 10.3 percent dioxane. The residue is a straw colored viscous liquid with 19.0 percent carbon dioxide, accounts for 84.8 percent (79.0 g) of the sample charged and has the properties shown below:

| Advanced | % Residue | % $CO_2$ | Molecular Weight Data | | | |
|---|---|---|---|---|---|---|
| | | | Peak | Mn | Mw | PDI |
| No | — | 18.7 | 1573 | 1041 | 1841 | 1.77 |
| Yes | 84.8 | 19.0 | 3485 | 2098 | 4513 | 2.15 |

Example 13 shows that a polyester polyol can be used as initiator. A 10:1 product is rapidly advanced to a much higher molecular weight product.

EXAMPLE 14

Part A:
A 10:1 mole ratio of ethylene carbonate to polyester polyol (poly(caprolactone) diol, MW=530) is heated with stirring under a nitrogen atmosphere for 4 hours at 175° C. using 0.5 percent sodium stannate trihydrate as catalyst to give 97.9 percent ethylene carbonate conversion to a poly(alkylene carbonate) polyol with 19.2 percent carbon dioxide. The catalyst is removed as in Example 1.

Part B:
A sample (91.3 g) of the polyol of Part A is subjected to fractional distillation with a maximum pot temperature of 235° C. and a pressure of 10 mm Hg. Distillate is collected in a water-chilled condenser and a dry ice-isopropanol trap. The distillate collected by the water-chilled condenser accounts for 13.6 percent (12.4 g) of the sample charged and has the following assay: 0.85 percent dioxane, 7.27 percent ethylene carbonate, 5.12 percent diethylene glycol and 1.42 percent triethylene glycol. The distillate collected in the dry ice-isopropanol trap accounts for 5.8 percent (5.3 g) of the sample charged and has the following assay: 89.1 percent acetone and 9.3 percent dioxane. The residue is a straw colored viscous liquid with 22.1 percent carbon dioxide, accounts for 80.0 percent (73.0 g) of the sample charged and has the properties shown below:

| Advanced | % Residue | % $CO_2$ | Molecular Weight Data | | | |
|---|---|---|---|---|---|---|
| | | | Peak | Mn | Mw | PDI |
| No | — | 19.2 | 1968 | 1175 | 2213 | 1.88 |
| Yes | 80.0 | 22.1 | 6145 | 3033 | 7015 | 2.31 |

Example 14 shows that a different type of polyester polyol can be used as initiator. A 10:1 product is rapidly advanced to a molecular weight much greater than a 100:1 product while maintaining a relatively low polydispersity index.

EXAMPLE 15

Part A:
A 10:1 mole ratio of ethylene carbonate to N-methyldiethanolamine is heated with stirring under a nitrogen atmosphere for 5 hours at 135° C. using 0.5 percent sodium stannate trihydrate as catalyst to give poly(alkylene carbonate) polyol. The catalyst is removed as in Example 1.

Part B:
A sample (87.1 g) of the polyol of Part A is subjected to fractional distillation with a maximum pot temperature of 200° C. and a pressure of 10 mm Hg. Distillate is collected in a water-chilled condenser and a dry ice-isopropanol trap. The distillate collected by the water-chilled condenser accounts for 36.1 percent (31.4 g) of the sample charged and has the following assay: 3.68 percent dioxane, 2.03 percent ethylene carbonate, 66.3 percent diethylene glycol, 7.73 percent N-methyldiethanolamine and 4.21 percent triethylene glycol. The distillate collected in the dry ice-isopropanol trap accounts for 12.6 percent (11.0 g) of the sample charged and has the following assay: 30.7 percent acetone and 38.3 percent dioxane. The residue is a dark viscous liquid, accounts for 44.3 percent (38.6 g) of the sample charged and has the properties shown below:

| Advanced | % Residue | Molecular Weight Data | | | |
|---|---|---|---|---|---|
| | | Peak | Mn | Mw | PDI |
| No | — | 264 | 313 | 573 | 1.83 |
| Yes | 44.3 | 1450 | 989 | 2242 | 2.27 |

Example 15 shows that a material containing a tertiary nitrogen in its backbone can function as initiator. A 10:1 product is rapidly advanced to a higher molecular weight product.

EXAMPLE 16

Part A:
A 5:1 mole ratio of ethylene carbonate to thiodiethanol is heated with stirring under a nitrogen atmosphere for 6 hours at 150° C. using 1.0 percent sodium stannate trihydrate as catalyst to give 92 percent ethylene carbonate conversion to a poly(alkylene carbonate) polyol. The catalyst is removed as in Example 1.

Part B:
A sample (93.4 g) of the polyol of Part A is subjected to fractional distillation at a pressure of 10 mm Hg. Samples for molecular weight determination are removed at various pot temperatures up to 222° C. Distillate is collected in a water-chilled condenser and a dry ice-isopropanol trap. The distillate collected by the water-chilled condenser accounts for 44.4 percent (41.5 g) of the sample charged and has the following assay: 0.91 percent dioxane, 13.5 percent ethylene carbonate, 63.4 percent diethylene glycol, 11.3 percent thiodiethanol and 2.13 percent triethylene glycol. The distillate collected in the dry ice-isopropanol trap accounts for 11.0 percent (10.3 g) of the sample charged and has the following assay: 5.73 percent acetone and 71.8 percent dioxane. The residue is a dark amber viscous liquid and accounts for 33.2 percent (31.0 g) of the sample charged. Molecular weight build as a function of pot temperature is given below:

| Pot Temperature (°C.) | Molecular Weight Data | | | |
|---|---|---|---|---|
| | Peak | Mn | Mw | PDI |
| Part A Product | 419 | 366 | 583 | 1.59 |
| 170 | 1093 | 686 | 1324 | 1.93 |
| 195 | 2179 | 1101 | 2532 | 2.30 |
| 215 | 3278 | 1455 | 3767 | 2.59 |
| 222 | 1889 | 1048 | 2568 | 2.45 |

Example 16 shows that a material containing sulfur in its backbone can function as initiator. The molecular weight of a 5:1 product can be increased nearly fivefold by the process of this invention.

EXAMPLE 17

Part A:
A 10:1 mole ratio of ethylene carbonate to aminated poly(propylene glycol) (Jeffamine D-400, $\overline{M}w=430$, a product of the Jefferson Chemical Division of Texaco) is heated with stirring under a nitrogen atmosphere for 19 hours at 135° C. using 0.5 percent sodium stannate trihydrate as catalyst to give 96 percent ethylene carbonate conversion to a poly(alkylene carbonate) polyol with 11.1 percent carbon dioxide. The catalyst is removed in Example 1.

Part B:

A sample (97.6 g) of the polyol of Part A is subjected to fractional distillation with a maximum pot temperature of 225° C. and a pressure of 10 mm Hg. Distillate is collected in a water-chilled condenser and a dry ice-isopropanol trap. The distillate collectd by the water-chilled condenser accounts for 17.5 percent (17.1 g) of the sample charged and has the following assay: 0.79 percent monoethylene glycol, 11.9 percent ethylene carbonate, 81.0 percent diethylene glycol and 1.22 percent triethylene glycol. The distillate collected in the dry ice-isopropanol trap accounts for 2.3 percent (2.2 g) of the sample charged and has the following assay: 74.3 percent acetone and 16.8 percent dioxane. The residue is an amber viscous liquid with 12.9 percent carbon dioxide, accounts for 79.7 percent (77.8 g) of the sample charged and has the properties shown below:

| Advanced | % Residue | % $CO_2$ | Molecular Weight Data | | | | Basicity (meq/gm) |
|---|---|---|---|---|---|---|---|
| | | | Peak | $\overline{Mn}$ | $\overline{Mw}$ | PDI | |
| No | — | 11.1 | 843 | 708 | 1497 | 2.11 | 0.120 |
| Yes | 79.7 | 12.9 | 3415 | 1837 | 4861 | 2.65 | 0.131 |

Carbon-13 NMR shows that the product contains urea (158.0 ppm), urethane (156.0 ppm) and carbonate (155.0 ppm) moieties. It also shows both hydroxyl and amino end groups.

This example shows that the polyahls of this invention can be made by using an amine initiator with ethylene carbonate to yield a product with both hydroxyl and amino end groups.

EXAMPLE 18

Part A:

A 5:1 mole ratio of ethylene carbonate (418.5 g) and Jeffamine D-400 (415.5 g) is heated in a 1,000 ml, 3-necked flask equipped with a thermometer, stirrer, condenser, temperature controller and maintained under a nitrogen atmosphere for 7 hours and 135° C. using 0.5 percent (4.17 g) sodium stannate trihydrate as catalyst. The catalyst is removed as in Example 1. The product (655.6 g) is a yellow liquid with a carbon dioxide content of 7.0 percent and a D-400 content of 63.3 percent.

Part B:

A sample of the D-400 initiated product (88.5 g) and boiling stones (0.2 g) are combined in a 100-ml flask equipped with a thermometer, temperature controller and a simple takeoff head with a water-chilled condenser attached to a vacuum source through a dry ice-isopropanol (about −78° C.) trap. The contents of the flask are heated to 220° C. over a period of 3 hours at 10 mm Hg vacuum. The distillate collected in the water-chilled condenser accounts for 19.3 percent (17.1 g) of the sample charged and has the following assay: 1.5 percent ethylene carbonate, 84.5 percent diethylene glycol and 1.9 percent triethylene glycol. The distillate collected at −78° C. accounts for 0.4 percent (0.4 g) of the sample charged. The residue is a light amber, viscous liquid representing 79.6 percent (70.4 g) of the sample charged, contains 0.585 meq/gm of titratable base, has a Brookfield viscosity of 84,300 cps at 25° C. and has the properties shown below:

| Advanced | % Residue | Molecular Weight Data | | | | Basicity (meq/gm) |
|---|---|---|---|---|---|---|
| | | Peak | $\overline{Mn}$ | $\overline{Mw}$ | PDI | |
| No | — | 352 | 527 | 983 | 1.86 | 0.475 |
| Yes | 79.6 | 2630 | 2531 | 6707 | 2.65 | 0.585 |

Carbon-13 NMR shows that the product contains both urea (158.0 ppm) and urethane (156.0 ppm) moieties but no carbonate moieties. It also shows both hydroxyl and amino end groups.

This example shows that the compositions of this invention can be made by using an amine initiator with ethylene carbonate to give materials which contain urea and urethane moieties in the backbone.

EXAMPLE 19

Part A:

A 50:1 mole ratio of ethylene carbonate to diethylene glycol is heated with stirring under a nitrogen atmosphere for 45 hours at 160° C. using 1.0 percent sodium metaborate as catalyst to give 100 percent ethylene carbonate conversion to a poly(alkylene carbonate) polyol with 17.8 percent carbon dioxide. The catalyst is removed as in Example 1.

Part B:

A sample (105.7 g) of the polyol of Part A is subjected to fractional distillation with a maximum pot temperature of 235° C. and a pressure of 10 mm Hg. Distillate is collected in a water-chilled condenser and a dry ice-isopropanol trap. The distillate collected by the water-chilled condenser accounts for 9.6 percent (10.1 g) of the sample charged and has the following assay: 1.19 percent dioxane, 60.9 percent diethylene glycol, 24.8 percent triethylene glycol and 1.05 percent tetraethylene glycol. The distillate collected in the dry ice-isopropanol trap accounts for 4.1 percent (4.3 g) of the sample charged and has the following assay: 83.4 percent acetone and 3.47 percent dioxane. The residue is a very light yellow, viscous liquid with 21.0 percent carbon dioxide, accounts for 86.2 percent (91.2 g) of the sample charged and has the properties shown below:

| Advanced | % Residue | % $CO_2$ | Molecular Weight Data | | | |
|---|---|---|---|---|---|---|
| | | | Peak | $\overline{Mn}$ | $\overline{Mw}$ | PDI |
| No | — | 17.8 | 1284 | 754 | 1445 | 1.91 |
| Yes | 86.2 | 21.0 | 2900 | 1389 | 3184 | 2.29 |

Example 19 shows that poly(alkylene carbonate) polyols made using sodium metaborate as catalyst can be advanced to much higher molecular weight products by the process of this invention.

Example 20

Part A:

A 10:1 mole ratio of ethylene carbonate to diethylene glycol is heated with stirring under a nitrogen atmosphere for 3 hours at 150° C. using 1.0 percent potassium carbonate as catalyst to give 95 percent ethylene carbonate conversion to a poly(alkylene carbonate) polyol with 11.6 percent carbon dioxide. The catalyst is removed as in Example 1.

Part B:

A sample (102.2 g) of the polyol of Part A is subjected to fractional distillation with a maximum pot temperature of 210° C. and a pressure of 10 mm Hg. Distillate is collected in a water-chilled condenser and a dry ice-isopropanol trap. The distillate collected by the water-chilled condenser accounts for 20.3 percent (20.8 g) of the sample charged and has the following assay: 0.53 percent dioxane, 12.03 percent ethylene carbonate, 19.8 percent diethylene glycol, 35.3 percent triethylene glycol and 7.54 percent tetraethylene glycol. The distillate collected in the dry ice-isopropanol trap accounts for 4.6 percent (4.7 g) of the sample charged and has the following assay: 58.8 percent acetone and 29.5 percent dioxane. The residue is an amber viscous liquid with 11.6 percent carbon dioxide, accounts for 69.8 percent (71.3 g) of the sample charged and has the properties shown below:

| Advanced | % Residue | % $CO_2$ | Molecular Weight Data | | | |
|---|---|---|---|---|---|---|
| | | | Peak | $\overline{Mn}$ | $\overline{Mw}$ | PDI |
| No | — | 11.6 | 678 | 448 | 751 | 1.68 |
| Yes | 69.8 | 11.6 | 969 | 684 | 1089 | 1.59 |

Example 20 shows that poly(alkylene carbonate) polyols made using potassium carbonate as catalyst can be advanced to higher molecular weight products by the process of this invention.

Example 21

Part A:

A 5:1 mole ratio of propylene carbonate to diethylene glycol is heated with stirring under a nitrogen atmosphere for 12 hours at 175° C. using 1.0 percent sodium stannate trihydrate as catalyst to give poly(alkylene carbonate) polyol. The catalyst is removed as in Example 1.

Part B:

A sample (91.3 g) of the polyol of Part B is subjected to fractional distillation with a maximum pot temperature of 235° C. and a pressure of 10 mm Hg. Distillate is collected in a water-chilled condenser and a dry ice-isopropanol trap. The distillate collected by the water-chilled condenser accounts for 62.3 percent (56.9 g) of the sample charged and has the following assay: 0.93 percent propylene glycol, 25.6 percent propylene carbonate, 37.2 percent dipropylene glycol and 7.57 percent tripropylene glycol. The distillate collected in the dry ice-isopropanol trap accounts for 3.6 percent (3.3 g) of the sample charged and has the following assay: 44.5 percent acetone and 15.9 percent dioxane. The residue is an amber viscous liquid, accounts for 32.1 percent (29.3 g) of the sample charged and has the properties shown below:

| Advanced | % Residue | Molecular Weight Data | | | |
|---|---|---|---|---|---|
| | | Peak | $\overline{Mn}$ | $\overline{Mw}$ | PDI |
| No | — | 213 | 316 | 535 | 1.69 |
| Yes | 32.1 | 4101 | 1958 | 5294 | 2.70 |

Example 21 shows that propylene carbonate can be used to make poly(alkylene carbonate) polyols and that these polyols can be advanced to much higher molecular weights by the process of this invention.

EXAMPLES 22-27

A mixture of ethylene carbonate and alcohol having the mole ratio shown in the table below is heated with stirring under a nitrogen atmosphere in the presence of sodium stannate trihydrate (1.0 percent) as catalyst to a high ethylene carbonate conversion. After reaction is complete, the catalyst is removed by the procedure used in Example 1. Reaction conditions and EC conversion are summarized below:

| Example | Initiator | EC/Initiator | Reaction Time (hr) | Reaction Temperature (°C.) | EC Conversion (%) |
|---|---|---|---|---|---|
| 22 | n-Butanol | 10 | 25.0 | 160 | 99.6 |
| 23 | n-Hexanol | 10 | 25.5 | 150 | 98.0 |
| 24 | n-Octanol | 10 | 22.0 | 160 | 100.0 |
| 25 | n-Decanol | 10 | 22.0 | 160 | 99.4 |
| 26 | n-Dodecanol | 5 | 21.5 | 160 | 100.0 |
| 27 | n-Dodecanol | 20 | 23.5 | 160 | 96.5 |

Examples 22-27 show the preparation of poly(alkylene carbonate) polyols using monofunctional initiators.

EXAMPLE 28

A portion of the poly(alkylene carbonate) polyol of Example 23 is placed in a two-necked, 100-ml boiling flask and several boiling stones are added. The flask is equipped with a thermometer and heating mantle and attached to a distilling apparatus connected to a vacuum source. The polyol is subjected to fractionation to give a residue of 49.1 g of a light amber viscous liquid with a 31.0 percent carbon dioxide (96 percent carbon dioxide retention). Properties are given below:

| | Molecular Weight Data | | | | % $CO_2$ |
|---|---|---|---|---|---|
| | Peak | $\overline{Mn}$ | $\overline{Mw}$ | PDI | |
| Before Fractionation | 1063 | 507 | 1077 | 2.122 | 26.5 |
| After Fractionation | 3539 | 1935 | 3436 | 1.775 | 31.0 |

Fractionation advances the molecular weight higher than the 50:1 adduct and maintains a good poly-dispersity index. Product analysis by proton nuclear magnetic resonance indicates no detectable $n\text{-}C_8\text{-}C_{17}$ moieties.

Example 28 shows that a poly(alkylene carbonate) polyol made using n-hexanol as initiator can be rapidly advanced to a molecular weight greater than a 50:1 product while maintaining a relatively low poly-dispersity index.

EXAMPLE V

A portion of the poly(alkylene carbonate) polyol of Example 24 is fractionated using the same equipment as in Example 28. The maximum pot temperature is 191° C. at 0.7 mm Hg pressure. The distillate (17.5 g) contains 93 percent octanol, 2 percent dioxane and 4 percent diethylene glycol. The residue (63.4 g) is a light amber viscous liquid with 31.7 percent carbon dioxide. Properties are given below:

| | Molecular Weight Data | | | | % $CO_2$ |
|---|---|---|---|---|---|
| | Peak | $\overline{Mn}$ | $\overline{Mw}$ | PDI | |
| Before Fractionation | 785 | 450 | 889 | 1.972 | 23.4 |
| After Fractionation | 3539 | 2092 | 3593 | 1.718 | 31.7 |

There is considerable molecular weight advancement while reducing the amount of poly-dispersity.

Example 29 shows that a poly(alkylene carbonate) polyol made using n-octanol as initiator can be rapidly advanced to a molecular weight of about that of a 50:1 product while maintaining a lower poly-dispersity index.

EXAMPLE 30

Part A:

An n-octanol initiated adduct is made from ethylene oxide and carbon dioxide at 150° C. using sodium stannate trihydrate as catalyst. The catalyst is removed by the procedure described in Example 1. The residue is a poly(alkylene carbonate) polyol with 12.1 percent carbon dioxide.

Part B:

The poly(alkylene carbonate) polyol of Part A is fractionated using the same equipment as Example 28. The maximum pot temperature is 190° C. at 0.3 mm Hg pressure. The distillate (17.8 g) contains 79 percent octanol, 1 percent monoethylene glycol and 1 percent diethylene glycol. The residue (13.9 g) is a light amber viscous liquid with 25.7 percent carbon dioxide. The alkanol moieties (97.2 percent) are removed by fractionation. Properties are given below:

|  | Molecular Weight Data | | | | % |
|---|---|---|---|---|---|
|  | Peak | $\overline{M}_n$ | $\overline{M}_w$ | PDI | $CO_2$ |
| Before Fractionation | 234 | 229 | 283 | 1.235 | 12.1 |
| After Fractionation | 4723 | 1878 | 4832 | 2.572 | 25.7 |

There is considerable molecular weight advancement.

Example 30 shows that a poly(alkylene carbonate) polyol made from ethylene oxide and carbon dioxide using n-octanol as initiator can be advanced to a high molecular weight product using the process of this invention.

EXAMPLE 31

A poly(alkylene carbonate) polyol prepared in Example 25 is fractionated using the same equipment as in Example 27. The maximum pot temperature is 193° C. at 0.7 mm Hg pressure. The distillate (12.8 g) contains 86 percent decanol, 12 percent diethylene glycol, 0.5 percent ethylene carbonate and 0.5 percent monoethylene glycol. The residue (59.8 g) is a light amber viscous liquid with 26.6 percent carbon dioxide (90 percent carbon dioxide retention) and has the properties given below:

|  | Molecular Weight Data | | | | % |
|---|---|---|---|---|---|
|  | Peak | $\overline{M}_n$ | $\overline{M}_w$ | PDI | $CO_2$ |
| Before Fractionation | 1063 | 555 | 1304 | 2.351 | 24.6 |
| After Fractionation | 3321 | 1901 | 3240 | 1.704 | 26.6 |

Example 31 shows that a poly(alkylene carbonate) polyol made using n-decanol as initiator can be rapidly advanced to a molecular weight greater than a 50:1 product while obtaining a lower poly-dispersity index. Nearly half of the initiator remains in the product.

EXAMPLE 32

A portion of the poly(alkylene carbonate) polyol of Example 26 is fractionated using the same equipment as in Example 28. The maximum pot temperature is 170° C. at 1.1 mm Hg pressure. The distillate (11.5 g) contains 65 percent diethylene glycol, 31 percent dodecanol, and 0.5 percent monoethylene glycol. The residue (51.9 g) is a light amber viscous liquid with 20.4 percent carbon dioxide (100 percent carbon dioxide retention) and has the properties given below:

|  | Molecular Weight Data | | | | % |
|---|---|---|---|---|---|
|  | Peak | $\overline{M}_n$ | $\overline{M}_w$ | PDI | $CO_2$ |
| Before Fractionation | 358 | 329 | 546 | 1.657 | 15.7 |
| After Fractionation | 570 | 742 | 1417 | 1.909 | 20.1 |

There is some molecular weight advancement but the majority of the initiator remains in the product.

EXAMPLE 33

A portion of the poly(alkylene carbonate) polyol of Example 27 is fractionated using the same equipment as in Example 28. The maximum pot temperature is 194° C. at 0.8 mm Hg pressure. The distillate (10.6 g) contains 35 percent ethylene carbonate, 21 percent dodecanol, 41 percent diethylene glycol and 0.5 percent monoethylene glycol. The residue (81.3 g) is a light amber viscous liquid with 28.0 percent carbon dioxide (94 percent carbon dioxide retention) and has the properties given below:

|  | Molecular Weight Data | | | | % |
|---|---|---|---|---|---|
|  | Peak | $\overline{M}_n$ | $\overline{M}_w$ | PDI | $CO_2$ |
| Before Fractionation | 1873 | 685 | 1995 | 2.910 | 25.7 |
| After Fractionation | 2950 | 1943 | 3209 | 1.652 | 28.0 |

There is considerable molecular weight advancement while reducing the amount of poly-dispersity. However, the majority of the initiator remains in the product.

Examples 32 and 33 show that when a poly(alkylene carbonate) polyol made using n-dodecanol is used as initiator, product advancement to higher molecular weights can occur by the process of this invention but the majority of the initiator remains in the product.

EXAMPLE 34

Portions of the poly(alkylene carbonate) of Example 22 are fractionated at several different pressures.

(A) At 40 mm Hg Pressure:

The sample is fractionated using the same equipment as in Example 28 above except that a 50-ml flask is used. The maximum pot temperature is 198° C. The distillate (3.4 g) contains 95 percent butanol and 3 percent dioxane. The residue (33.2 g) is a light amber viscous oil with 28.8 percent carbon dioxide (100 percent carbon dioxide retention).

(B) At 100 mm Hg Pressure:

The sample (33.7 g) is fractionated using the same equipment as in (A). The maximum pot temperature is 210° C. The distillate (3.1 g) contains 93 percent butanol and 5 percent dioxane. The residue (30.3 g) is a light amber viscous oil with 26.5 percent carbon dioxide (95 percent carbon dioxide retention).

(C) At 760 mm Hg Pressure:

The sample (36.7 g) is fractionated using the same equipment as in (A). The maximum pot temperature is 253° C. The distillate (7.6 g) contains 50 percent butanol and 50 percent dioxane. The residue (23.7 g) is a light amber viscous oil with 26.8 percent carbon dioxide (69 percent carbon dioxide retention).

|  | Molecular Weight Data | | | |
| --- | --- | --- | --- | --- |
|  | Peak | $\overline{Mn}$ | $\overline{Mw}$ | PDI |
| Before Fractionation | 881 | 590 | 928 | 1.571 |
| 253° C. Pot/760 mm | 1151 | 715 | 1153 | 1.612 |
| 210° C. Pot/100 mm | 1641 | 866 | 1535 | 1.773 |
| 198° C. Pot/40 mm | 2135 | 1242 | 2144 | 1.725 |

Molecular weight advancement occurs in each case and is higher as the fractionation pressure is reduced.

| Conditions | % $CO_2$ | % $CO_2$ Lost | % Butanol | % Butanol Lost |
| --- | --- | --- | --- | --- |
| Before Fractionation | 25.1 | — | 9.38 | — |
| 253° C. Pot/760 mm | 26.8 | 31.1 | 3.29 | 77.3 |
| 210° C. Pot/100 mm | 26.5 | 5.0 | 3.19 | 69.3 |
| 198° C. Pot/40 mm | 28.8 | * | 1.00 | 90.6 |

*No detectable loss

Example 34 shows the effect of pressure on the molecular weight advancement of poly(alkylene carbonate) polyols made using n-butanol as initiator. As the pressure is lower, the $CO_2$ content and molecular weight increase while the n-butanol content in the product decreases.

EXAMPLE 35

A low molecular weight ($\overline{Mn}$ of 700) poly(ethylene ether carbonate) polyol (960.0 g; prepared from diethylene glycol, ethylene oxide and carbon dioxide) is placed in a 1-1, 3-necked reaction flask equipped with thermometer, overhead stirrer, dropping funnel, temperature controller and maintained under a nitrogen atmosphere. Methylene-bis(phenyl isocyanate) (108.10 g; MDI; Isonate ® 125M; freshly distilled) is placed in the dropping funnel. The MDI is added dropwise with stirring over a 30-minute period at ambient temperature. The contents of the reactor are then heated at 80° C. for four hours. The product (1,066.5 g) is a straw-colored, viscous liquid with a Brookfield viscosity of 31,000 cps at 24° C. and has the following molecular weight properties: Peak=2419; $\overline{Mn}$=1473; $\overline{Mw}$=2736; PDI=1.86. Carbon-13 NMR is consistent with the expected MDI-modified poly(ethylene ether carbonate) polyol structure. The polyol backbone contains both carbonate (155.2 ppm) moieties and aromatic urethane (153.8 ppm) moieties.

This example shows that the backbone of a poly(ethylene ether carbonate) polyol can be modified with MDI to produce a hydroxy-functional polyol containing aromatic urethane moieties in its backbone.

EXAMPLE 36

A portion of the product from Example 35 (81.3 g) and boiling stones (0.2 g) are combined in the same equipment used in Example 1. The contents of the flask are heated at 10 mm Hg vacuum and samples are removed for molecular weight determination at various pot temperatures:

| Sample Number | Pot Temperature (°C.) | Molecular Weight Data | | | |
| --- | --- | --- | --- | --- | --- |
| | | Peak | $\overline{Mn}$ | $\overline{Mw}$ | PDI |
| 1 | starting material | 2419 | 1473 | 2736 | 1.86 |
| 2 | 200 | 2469 | 1510 | 2875 | 1.90 |
| 3 | 220 | 2905 | 1698 | 3477 | 2.05 |
| 4 | 230 | 3851 | 2014 | 4375 | 2.17 |
| 5 | 240 | 4340 | 2251 | 5295 | 2.35 |
| 6 | 252 | 6781 | 2876 | 7759 | 2.69 |

When the pot temperature reaches 252° C., the system is cooled under nitrogen. The distillate collected in the water condenser accounts for 9.6 percent (7.8 g) of the sample charged and has the following assay: 0.65 percent dioxane, 2.39 percent ethylene carbonate, 66.4 percent diethylene glycol, 16.7 percent triethylene glycol and 1.15 percent tetraethylene glycol. The distillate collected in the dry ice-isopropanol trap accounts for 0.6 percent (0.5 g) of the sample charged. The residue is a yellow, viscous liquid accounting for 86.5 percent (70.3 g) of the sample charged and has a Brookfield viscosity of 426,000 cps at 24° C.

This example shows that a series of urethane-modified poly(ethylene ether carbonate) polyols of various molecular weight can be made by the process of this invention.

EXAMPLE 37

A portion of the product from Example 35 (900.8 g) and boiling stones (0.2 g) are combined in a 1-1, 3-necked boiling flask equipped with a thermometer, temperature controller and a down draft water-chilled condenser attached to a vacuum source through a dry ice-isopropanol trap (about −78° C.). The contents of the reactor are heated to a pot temperature of 230° C. over a period of 2 hours at 10 mm Hg vacuum. The distillate collected in the water-chilled condenser accounts for 4.5 percent (40.5 g) of the sample charged and has the following assay: 0.90 percent dioxane, 9.55 percent ethylene carbonate, 53.9 percent diethylene glycol, 25.2 percent triethylene glycol and 3.90 percent tetraethylene glycol. The distillate collected at −78° C. accounts for 0.2 percent (1.9 g) of the sample charged and has the following assay: 45.0 percent dioxane, 36.5 percent acetone and 6.6 percent water. The residue is a light amber, viscous liquid containing 10.7 percent MDI chemically incorporated into the polyol backbone, represents 94.8 percent (853.5 g) of the sample charged and has a Brookfield viscosity of 106,400 cps at 24° C. The $\overline{Mn}$ by end group (OH) titration is 1,560. The molecular weight by size exclusion chromatograph is: Peak=3,484; $\overline{Mn}$=1,912; $\overline{Mw}$=3,954; PDI=2.07.

This example shows the production of a urethane-modified poly(ethylene ether carbonate) polyol.

EXAMPLE 38

The low molecular weight poly(ethylene ether carbonate) polyol used in Example 35 (10001.7 g) is placed in the same reaction setup as used in Example 35. MDI (60.1 g, freshly distilled, 125M) is placed in the dropping funnel and added dropwise with stirring over a 15-minute period at ambient temperature. The contents of the reactor are then heated to 80° C. for 3 hours. The product (1,061.5 g) is a straw-colored, viscous liquid with a Brookfield viscosity of 9,210 cps at 25° C. and has the following molecular weight properties: Peak=1677; $\overline{Mn}$=1117; $\overline{Mw}$=1937; PDI=1.74.

A portion of the product formed above (913.1 g) and boiling stones (0.2 g) are combined in the same equipment used in Example 37. The contents of the reactor are heated to a pot temperature of 230° C. over a period of 2 hours at 10 mm Hg vacuum. The distillate collected in the water-chilled condenser accounts for 9.1 percent (82.7 g) of the sample charged and has the following assay: 0.69 percent dioxane, 6.11 percent ethylene carbonate, 50.4 percent diethylene glycol, 29.4 percent triethylene glycol and 5.60 percent tetraethylene glycol. The distillate collected at −78° C. accounts for 0.3 percent (2.6 g) of the sample charged and has the following assay: 45.7 percent dioxane, 36.4 percent acetone and 6.1 percent water. The residue is a light amber, viscous liquid containing 6.28 percent MDI chemically incorporated into the polyol backbone, represents 90.2 percent (823.4 g) of the sample charged and has a Brookfield viscosity of 63,300 cps at 24° C. The $\overline{M}n$ by end group (OH) titration is 1752. The molecular weight by size exclusion chromatography is: Peak=4,089; $\overline{M}n$=2,103; $\overline{M}w$=4,463; PDI=2.12. Carbon-13 NMR indicates that the polyol backbone contains both carbonate (155.2 ppm) moieties and aromatic urethane (153.8 ppm) moieties.

Example 39

The low molecular weight poly(ethylene ether carbonate) polyol used in Example 35 (1,001.9 g) is placed in the same reaction setup as used in Example 1. TDI (61.0 g, 80 percent toluene-2,4-diisocyanate and 20 percent toluene-2,6-diisocyanate) is placed in the dropping funnel and added dropwise with stirring over a 15-minute period at ambient temperature. The contents of the reactor are then heated to 80° C. for 3 hours. The product (1,062.9 g) is a straw-colored viscous liquid with a Brookfield viscosity of 13,600 cps at 24° C. and has the following molecular weight properties: Peak=2,014; $\overline{M}n$=1,189; $\overline{M}w$=2,123; PDI=1.79.

A portion of the product formed above (912.6 g) and boiling stones (0.2 g) are combined in the same equipment used in Example 37. The contents of the reactor are heated to a pot temperature of 230° C. over a period of 2 hours at 10 mm Hg Vacuum. The distillate collected in the water-chilled condenser accounts for 8.0 percent (73.1 g) of the sample charged and has the following assay: 7.00 percent ethylene carbonate, 54.9 percent diethylene glycol, 26.8 percent triethylene glycol and 4.30 percent tetraethylene glycol. The distillate collected at −78° C. accounts for 0.2 percent (2.0 g) of the sample charged and has the following assay: 31.7 percent dioxane, 44.4 percent acetone and 10.1 percent water. The residue is a light amber, viscous liquid containing 6.29 percent TDI chemically incorporated into the polyol backbone, represents 91.3 percent (832.8 g) of the sample charged and has a Brookfield viscosity of 101,800 cps at 24° C. The $\overline{M}n$ by end group (OH) titration is 1,820. The molecular weight by size exclusion chromatography is: Peak=3,700; $\overline{M}n$=2,024; $\overline{M}w$=4,370; PDI=2.16. Carbon-13 NMR indicates that the polyol backbone contains both carbonate (155.2 ppm) moieties and aromatic urethane (153.8 ppm) moieties.

It is understood that various other modifications will be apparent also and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all the features which would be considered as equivalents thereof by those skilled in the art to which this invention pertains.

What is claimed is:

1. A process for increasing the molecular weight of a poly(alkylene carbonate) polyahl which comprises exposing the poly(alkylene carbonate) polyahl to elevated temperatures at which at least one compound other than a monoalkylene glycol is abstracted from the poly(alkylene carbonate) polyahl, said compound being at least as volatile as a tetraethylene glycol at a pressure wherein the compound is gaseous, and removing the gaseous compound from the mass of the poly(alkylene carbonate) polyahl, under conditions such that the molecular weight of the poly(alkylene carbonate) polyahl is increased.

2. The process of claim 1, in which said reaction forming the poly(alkylene carbonate) polyahl having increased molecular weight takes place simultaneously with removing at least one gaseous compound other than a monoalkylene glycol.

3. The process of claim 1, wherein a dialkylene glycol is removed from said reaction.

4. The process of claim 1, wherein a trialkylene glycol is removed from said reaction.

5. The process of claim 1, wherein an initiator is removed from said reaction, said initiator being an organic compound containing one or more active hydrogen atoms.

6. The process of claim 1 wherein the pressure is subatmospheric.

7. The process of claim 6 wherein the temperature is between about 150° C. and about 300° C.

8. The process of claim 7 wherein the pressure is about 100 mm Hg or less.

9. The process of claim 1 wherein the poly(alkylene carbonate) polyahl is a random polymer which corresponds to the formula:

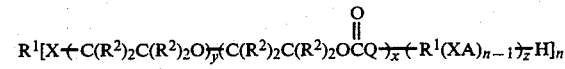

wherein

R$^1$ is separately in each occurrence an n-valent hydrocarbon radical or hydrocarbon radical which can contain one or more heteroatoms of O, N or S;

R$^2$ is separately in each occurrence hydrogen, halogen, a nitro group, a cyano group, a C$_{1-20}$ hydrocarbyl group or a C$_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH,

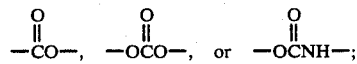

A is separately in each occurrence

or combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

10. The process of claim 9 wherein
X is S, O, or NH;
x is separately in each occurrence an integer from 2 to 10;
y is separately in each occurrence an integer from 5 to 15; and
z is an integer from 0 to 2,
provided that the ratio of y to x is from 1:1 to 3:1.

11. The process of claim 10 wherein $R^1$ is aliphatic or cycloaliphatic hydrocarbon containing one or more oxygen, nitrogen, or sulfur moieties; $R^2$ is hydrogen, $C_{1-20}$ alkyl, $C_{1-20}$ haloalkyl, $C_{1-20}$ alkenyl or phenyl; X is S, O, or NH; and n is an integer from 1 to 10.

12. The process of claim 11 wherein $R^1$ is an n-valent alkane or cycloalkane, or an n-valent alkane or cycloalkane containing one or more oxygen, nitrogen, or sulfur moieties; $R^2$ is hydrogen, methyl or ethyl; X is O; and n is an integer from 1 to 5.

13. The process of claim 12 wherein $R^1$ is an n-valent $C_{1-10}$ alkane or an n-valent $C_{1-10}$ alkane substituted with one or more oxygen moieties; $R_2$ is hydrogen or methyl; and n is 1 or 2.

14. The process of claim 13 wherein $R^2$ is hydrogen.

15. A process for increasing the molecular weight of a poly(alkylene carbonate) polyol which comprises
(a) exposing the poly(alkylene carbonate) polyol which is a random polymer which corresponds to the formula

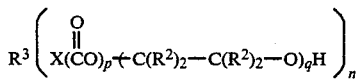

to temperatures of about 150° C. to 300° C. at subatmospheric pressures, such that dialkylene glycol or initiator segments, wherein the initiator has the same or greater volatility as the dialkylene glycol segment, is abstracted from the poly(alkylene carbonate) polyol wherein the dialkylene glycol segment corresponds to the formula $$HO-C(R^2)_2-C(R^2)_2-O-C(R^2)_2-C(R^2)_2-OH$$

and the initiator segment corresponds to the formula $R^3+X-H)_n$; and (b) separating the volatile dialkylene glycol segment or initiator segment from the poly(alkylene carbonate) polyol; under conditions such that the molecular weight of the poly(alkylene carbonate) polyol is increased, wherein
$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

$R^3$ is separately in each occurrence an n-valent hydrocarbon radical or hydrocarbon radical with one or more oxygen, sulfur or nitrogen moieties;

X is S, O, NH,

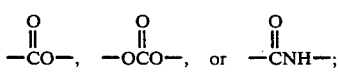

n is separately in each occurrence an integer of from 1 to 25;

p is separately in each occurrence 1 to 40; and q is separately in each occurrence an integer of 1 or greater.

16. The process of claim 1 wherein the poly(alkylene carbonate) polyol is a random polymer which corresponds to the formula

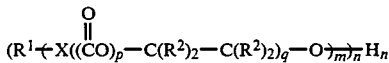

wherein
$R^1$ is separately in each occurrence an n-valent hydrocarbon radical or hydrocarbon radical which contains one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is S, O, NH,

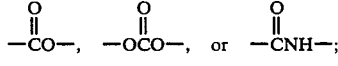

m is an integer of 1 or greater;
n is separately in each occurrence an integer of from 1 to 25;
p is separately in each occurrence 0 or 1; and
q is separately in each occurrence an integer of 1 or greater.

17. The process of claim 14 wherein said poly(alkylene carbonate) polyahl to be modified is a poly(ethylene carbonate) polyol.

18. The process of claim 1 wherein the poly(alkylene carbonate) polyahl is a reaction product of an organic polyisocyanate and an excess of a poly(alkylene carbonate) polyahl.

* * * * *